United States Patent [19]

Franks et al.

[11] 4,272,949
[45] Jun. 16, 1981

[54] ROTARY LAWN MOWER EDGING ATTACHMENT

[76] Inventors: Gerald N. Franks; Mae P. Franks, both of P.O. Box 4954, Greenville, Miss. 38701

[21] Appl. No.: 119,464

[22] Filed: Feb. 7, 1980

[51] Int. Cl.³ .............................................. A01G 3/06
[52] U.S. Cl. .................................................. 56/255
[58] Field of Search .............. 56/255, 256, 13.6, 13.7, 56/13.8, 16.9, 17.5

[56] References Cited

U.S. PATENT DOCUMENTS

| 3,197,950 | 8/1965 | Griffith | 56/255 |
| 3,197,951 | 8/1965 | Zick | 56/255 |
| 3,430,424 | 3/1969 | Hasenbank | 56/255 |

Primary Examiner—Jay N. Eskovitz

[57] ABSTRACT

An elongated front to rear extending ramp or wedge member is pivotally supported from the lower marginal edge portion of one side of a downwardly opening rotary lawn mower housing and angularly displaceable about an axis extending transversely of the housing and the wedge member between an operative forwardly and downwardly inclined position and a raised horizontal position. The wedge member, when in the forwardly and downwardly inclined operative position and moving along a marginal edge of the lawn area being cut, is operative to slide beneath and upwardly straightened blades of grass lying over a curb, walk, or driveway bordering the aforementioned marginal edge so that the raised blades of grass may be cut by the blade of the rotary mower. A Bowden cable is operatively connected between the wedge member and the rotary mower housing and may be remotely operated to swing the wedge member between the raised inoperative position and the lowered operative position. The wedge member underlies the adjacent periphery of the circular path through which the outer peripheral portions of the rotary blade swing and includes a forward edge inner side depending flange which may engage and be guided along a curb, walk or driveway structure.

7 Claims, 6 Drawing Figures

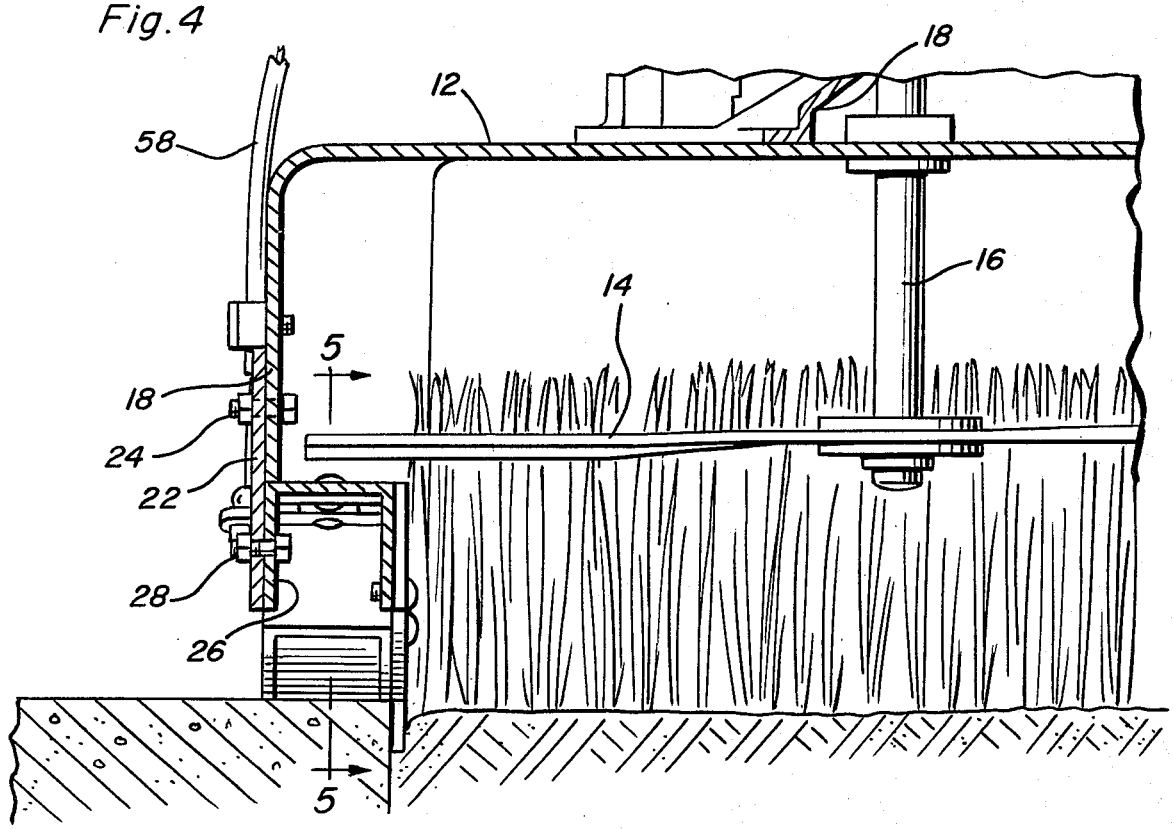
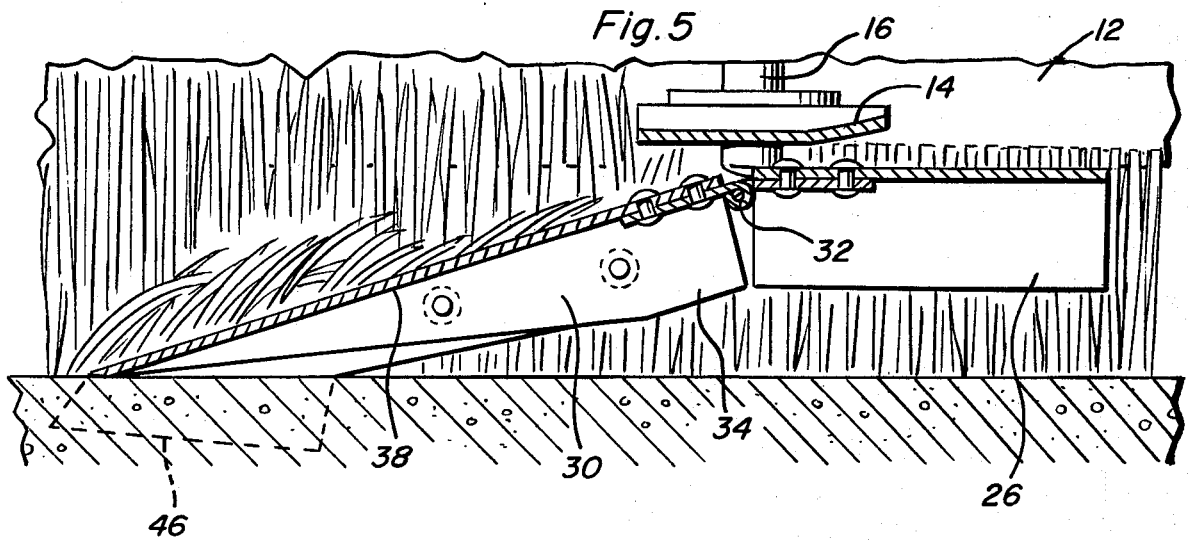
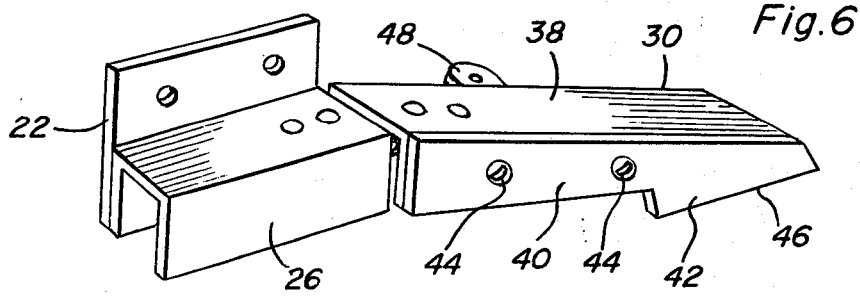

ROTARY LAWN MOWER EDGING ATTACHMENT

BACKGROUND OF THE INVENTION

Various forms of edging attachments heretofore have been provided for use in elevating blades of grass to be cut by a rotary mower along marginal edges of a lawn area being mowed. Some of these attachments are functional, to some degree, to effect the desired edging operation, but most experience operational difficulties rendering them less operative than desired. Accordingly, a need exists for an improved edging attachment for use in conjunction with rotary mowers.

Examples of various forms of known rotary mower edging attachments including some of the general structural and operational features of the instant invention are disclosed in U.S. Pat. Nos. 2,671,299, 3,197,951, and 3,839,851.

BRIEF DESCRIPTION OF THE INVENTION

The edging attachment of the instant invention comprises a simple, longitudinally extending, elongated wedge or ramp member which is preferably tapered toward its foward end and has its rear end pivotally supported from one associated mower housing side centrally intermediate its opposite end for angular displacement between an operative forwardly and downwardly inclined position and a raised generally horizontal inoperative position. The wedge member projects laterally inwardly beneath the open underside of the housing at an elevation spaced slightly below the plane in which the associated rotary motor blade swings and the wedge or ramp member is operative to be advanced beneath, engage and upwardly straighten blades of grass along a marginal edge of a lawn area defined by a curbing, a driveway or a walkway to thereby enable the straightened blades of grass to be cut by the blade of the rotary mower. The attachment includes a Bowden cable assembly operatively connected between the wedge member and the mower housing whereby the wedge member may be raised and lowered from a remote position.

The main object of this invention is to provide an edging attachment for a rotary mower which will be operative to effect proper cutting of blades of grass in those areas of a lawn bordering curbing, driveways or walkways.

Another object of this invention is to provide an edging attachment which, when not in operation, may be readily moved to an inoperative position.

Still another important object of this invention is to provide an edging attachment including structural features thereof enabling an operator therefor to be actuatable from a remote location for ease in effecting movement of the edging attachment between active and inactive positions.

Another important object of this invention is to provide an edging attachment for rotary mowers which may be readily incorporated into the manufacture of new mowers and also marketed for ready attachment to existing mowers.

A final object of this invention to be specifically enumerated herein is to provide a rotary mower edging attachment in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged fragmentary transverse vertical sectional view taken substantially upon the plane indicated by the section line 4—4 of FIG. 3;

FIG. 5 is a fragmentary vertical sectional view taken substantially upon the plane indicated by the section line 5—5 of FIG. 4; and FIG. 6 is a perspective view of the mount and pivoted ramp member portions of the edging attachment.

DETAILED DESCRIPTION OF THE INVENTION

Figure 1:
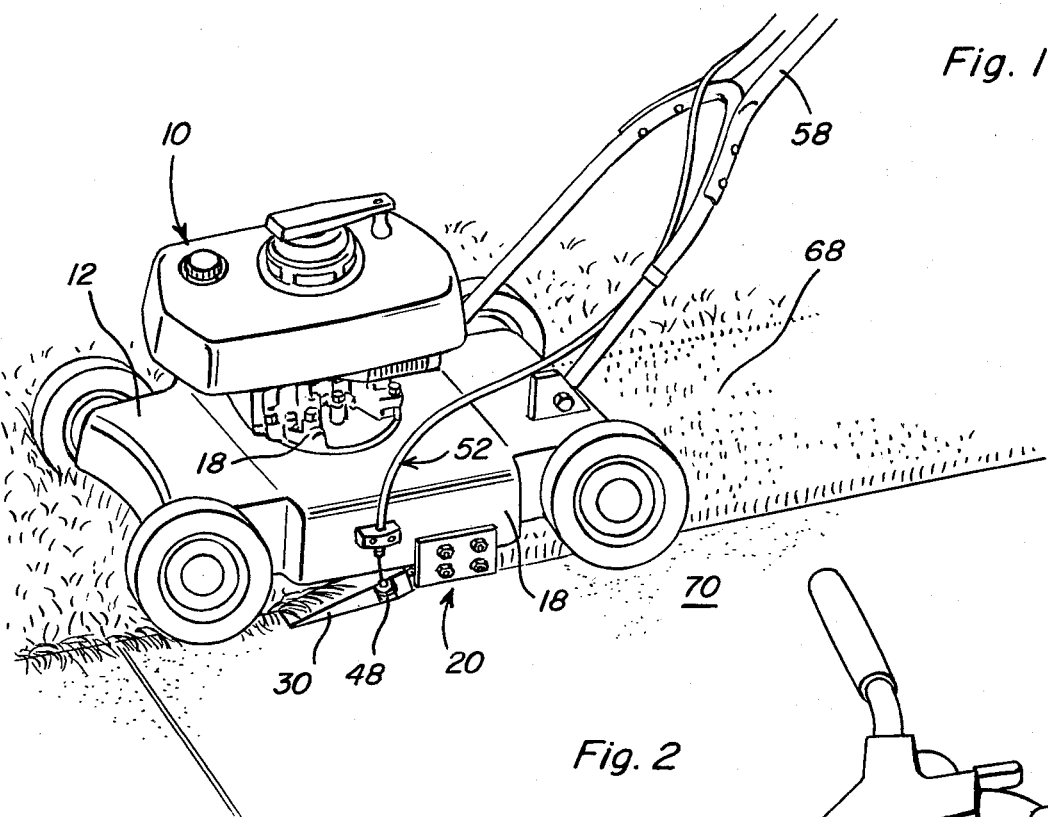
FIG. 1 is a perspective view of a conventional form of rotary mower with the edging attachment of the instant invention operatively associated therewith and in use to move beneath and upwardly straighten blades of grass extending along a marginal area of the lawn section being mowed.
Figure 2:
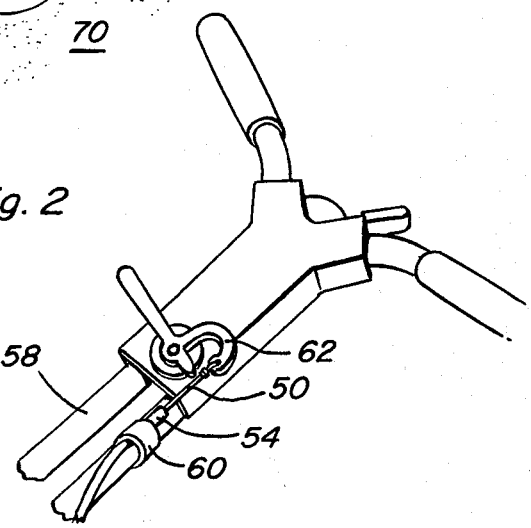
FIG. 2 is a fragmentary perspective view of the upper hand portions of the mower illustrating the Bowden cable actuator for the attachment.

Referring now more specifically to the drawings, the numeral 10 generally designates a conventional form of rotary mower including a downwardly opening housing 12 in which a rotary mower blade 14 is mounted. The mower blade 14 is attached to the lower end of the rotary output shaft 16 of the engine 18 of the mower 10 and the radial outermost portions of the blade 14 swing through a circular path which passes in close proximity to the left longitudinal side wall portion 18 of the housing 12 from which the edging attachment of the instant invention is operatively supported.

The edging attachment is referred to in general by the reference numeral 20 and includes a mounting plate 22 secured to the outer surface of the side wall portion 18 by suitable fasteners 24. The plate 22 projects downwardly below the marginal edge portion of the side wall portion 18 and has an elongated channel shaped mount 26 secured thereto by fasteners 28. The mount 26 is disposed on the inside of the lower marginal edge portion of the mounting plate 22 and pivotally supports the rear end of a front to rear extending inverted U-shaped ramp member 30 from the forward end thereof by a hinge assembly 32. The rear end of the ramp or wedge member 30 is of substantially the same transverse and vertical dimensions as the mount 26 and includes a pair of opposite side flanges 34 and 36 interconnected at their upper ends by a bight portion 38 extending therebetween. The forward end portions of the lower marginal edges of the flanges 34 and 36 are inclined upwardly toward the bight portion 38 whereby the vertical height of the forward end of the ramp member 30 is reduced to the thickness of the bight portion 38 and the inner side flange 34 of the ramp member 30 has a reinforcing plate 40 secured thereover including a forward lower marginal portion or flange extension 42 which projects downwardly below the adjacent marginal edge portion of the flange 34. The plate 40 is secured to the flange 34 by fasteners 44 and the lower edge 46 of the flange extension 42 is forwardly and upwardly inclined when the ramp member 30 is in the operative forward and downwardly inclined position thereof illustrated in FIG. 5.

The outer side of the rear portion of the ramp member 30 includes a horizontally outwardly projecting mounting ear 48 to which one end of the internal core 50 of a Bowden cable assembly referred to in general by the reference numeral 52 is anchored. The Bowden cable assembly 52 includes an outer housing 54 anchored relative to the side wall portion 18 as at 56 and the remote end of the Bowden cable assembly 52 has the corresponding end of the housing 54 anchored to the handle 58 of the mower 10 as at 60 and the end of the core 50 remote from the ramp member 30 anchored relative to an actuating lever 62 pivotally supported from the handle 58. Accordingly, the ramp member 36 may be swung from the forwardly and downwardly inclined operative position thereof illustrated in FIGS. 1, 3 and 5 of the drawings to a raised inoperative position with the upper surface 64 of the ramp member 30 substantially flush with and paralleling the lower marginal edge 66 of the side wall portion 18.

Figure 3:
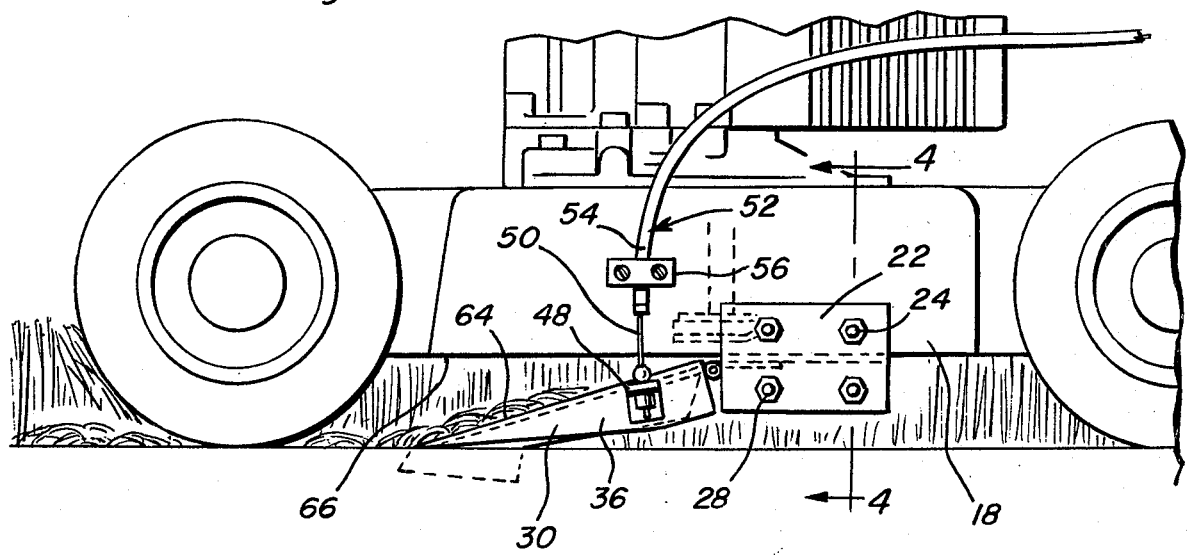
FIG. 3 is a fragmentary enlarged side elevational view of the assemblage illustrated in FIG. 1.

In operation, when it is desired to mow a lawn area 68 extending along a sidewalk 70, the Bowden cable assembly 52 is actuated to swing the ramp 30 downward to its operative position illustrated in FIGS. 1, 3 and 5 of the drawings. Then, the mower 10 is moved along the lawn area 68 at the marginal edge of the sidewalk 70. It may be seen from FIG. 1 of the drawings that the forward end of the ramp member 30 is moved beneath the blades of grass overlying the sidewalk 70 and upwardly straightens these blades of grass inwardly of the outer periphery of the rotary blade assembly 14 for cutting thereby with the result that the lawn area 68 is fully trimmed along the sidewalk 70.

The ramp member 30 and mount 26 are both constructed of inverted channel shaped members in order to prevent the accumulation of cut grass and other lawn debris therein and it is believed obvious that the attachment 20 may be readily incorporated into the manufacture of new rotary lawn mowers as well as manufactured in the form an attachment for existing lawn mowers. Further, when the ramp or wedge member 30 is raised to its inoperative position with the upper surface 64 closely underlying the lower marginal edge 66 of the side wall portion 18, the ramp member 30 in no way adversely affects the normal grass cutting operation of the mower 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a rotary lawn mower of the type including a downwardly opening wheeled housing in which a powered rotary cutting blade assembly is journaled for rotation about a vertical axis and with said housing including opposite side and front and rear end portions, a mount supported from one side of said housing intermediate the front and rear portions thereof, an elongated narrow ramp member including an elongated longitudinal upper surface, said ramp member extending in a front to rear direction relative to said housing and having its rear end portion pivotally supported from said mount for angular displacement of said ramp member between a lowered operative position with said upper surface forwardly and downwardly inclined and a raised operative position with said upper surface generally horizontally disposed, said upper surface including an inner side marginal edge portion underlying the outer periphery of the adjacent portion of the circular path through which the radial outermost portions of said blade assembly swing, and positioning means operatively connected between said ramp member and housing for releasably retaining said ramp member in said operative and inoperative positions.

2. The combination of claim 1 wherein said ramp member is generally wedge shaped in side elevation and tapers forwardly in vertical thickness.

3. The combination of claim 1 wherein at least the forward end portion of said ramp member includes a longitudinally extending and depending guide flange supported from the inner side marginal portion thereof.

4. The combination of claim 3 wherein said guide flange includes a lower longitudinally extending surface which is forwardly and upwardly inclined when said ramp member is in said lowered operative position.

5. The combination of claim 1 wherein said ramp member comprises an inverted U-shaped member including an upper horizontal bight portion and opposite side depending flange portions, the lower edges of said flange portions being forwardly inclined toward said bight portion.

6. The combination of claim 1 wherein said positioning means includes a Bowden cable operatively connected between said housing and said ramp member.

7. In combination with a rotary lawn mower of the type including a downwardly opening wheeled housing in which a powered rotary cutting blade assembly is journalled for rotation about a vertical axis and with said housing including opposite side, front and rear end portions, a mount supported from said housing, an elongated narrow ramp member including an elongated longitudinal upper surface, said ramp member extending in a front-to-rear direction relative to said housing, means supporting said ramp member from said mount for shifting of said ramp member between a lowered forwardly and downwardly inclined operative position and a raised inoperative position, said ramp member when in said lowered forwardly downwardly inclined operative position, being disposed with at least the inner side marginal edge portion of the upper surface of said ramp member underlying the outer periphery of the adjacent portion of the circular path through which the radial outermost portions of said blade assembly swing at one side of said housing, and positioning means operatively connected between said ramp member and housing for releasably retaining said ramp member in said operative and inoperative positions.

* * * * *